United States Patent [19]

Ito

[11] Patent Number: 5,539,296

[45] Date of Patent: Jul. 23, 1996

[54] METHOD AND SYSTEM OF CHARGING A PROPULSION BATTERY OF AN ELECTRICALLY POWERED VEHICLE

[75] Inventor: Makoto Ito, Kariya, Japan

[73] Assignee: Kabushiki Kaisha Toyoda Jidoshokki Seisakusho, Kariya, Japan

[21] Appl. No.: 371,466

[22] Filed: Jan. 11, 1995

Related U.S. Application Data

[63] Continuation of Ser. No. 165,975, Dec. 13, 1993, abandoned.

[30] Foreign Application Priority Data

Dec. 15, 1992 [JP] Japan ................................. 4-334241

[51] Int. Cl.$^6$ ................................................ H02J 7/00
[52] U.S. Cl. .................................................. 320/2; 320/21
[58] Field of Search ............................................. 320/2, 21

[56] References Cited

U.S. PATENT DOCUMENTS

| | | | |
|---|---|---|---|
| 3,654,537 | 4/1972 | Coffey | 320/1 |
| 3,938,018 | 2/1976 | Dahl | 320/2 |
| 4,347,472 | 8/1982 | Lemelson | 320/2 |
| 4,374,354 | 2/1983 | Petrovic et al. | 320/2 |
| 4,496,896 | 1/1985 | Melocik et al. | 320/2 |
| 4,800,328 | 1/1989 | Bolger et al. | 320/2 |
| 5,049,802 | 9/1991 | Mintus et al. | 320/2 |
| 5,070,293 | 12/1991 | Ishii et al. | 320/2 |
| 5,157,319 | 10/1992 | Klontz et al. | 320/2 |
| 5,216,402 | 6/1993 | Carosa | 336/66 |
| 5,264,776 | 11/1993 | Hulsey | 320/2 |

*Primary Examiner*—Peter S. Wong
*Assistant Examiner*—Aditya Krishnan
*Attorney, Agent, or Firm*—Brooks Haidt Haffner & Delahunty

[57] ABSTRACT

A battery charging method and system are provided which are applicable to battery-powered vehicles. According to the charging system of the invention, there is provided a primary charger including a primary winding which is connectable with a source of charging alternating current at a charging station. There are also provided at least two secondary chargers each connected with a battery on each vehicle and including a secondary winding having a number of winding turns which is different from that of the winding of the other secondary charger. Transfer of electrical energy from the primary charger to the secondary chargers is accomplished by inductively coupling the primary winding with any selected one of the secondary windings, as a result of which a voltage, the magnitude of which is dependent on the turns ratio between the primary and secondary windings, is produced across the selected secondary winding.

10 Claims, 5 Drawing Sheets

METHOD AND SYSTEM OF CHARGING A PROPULSION BATTERY OF AN ELECTRICALLY POWERED VEHICLE

This is a continuation of application Ser. No. 08/165,975, filed Dec. 13, 1993 now abandoned.

BACKGROUND OF THE INVENTION

The present invention relates to a method and a system of charging a propulsion battery of an electrically powered vehicle by inductively coupling a primary charger connected to a source of power with a secondary charger installed on a vehicle and connected to its battery.

Prior art publications such as U.S. Pat. Nos. 4,347,472, 4,496,896 and Publication of Unexamined Japanese Patent Application No. 63-73837 (1988) disclose apparatuses for charging a battery of an electrically powered vehicles, in which a charging unit having a secondary winding and mounted at the front end or the bottom of a vehicle is properly into an inductively coupled state with respect to a stationary battery charger provided at a charging station. In the inductively coupled state of the primary and secondary chargers, electrical energy applied across a winding in the primary charger is transferred to a winding in the secondary charger by electromagnetic induction.

U.S. Pat. No. 4,374,354 discloses a rechargeable electric portable appliance such as an electric toothbrush. In this appliance, the toothbrush unit, which carries at its bottom a secondary coil assembly with an E-shaped core as seen in cross section, is guided vertically and inserted within a well in a base unit containing a primary coil assembly with a similar E-shaped core, where magnetic coupling is established between the primary and secondary windings.

Still another prior art of Publication of Unexamined Japanese Patent Application No. 3-239137 (1991) proposes an inductive coupler which includes a secondary coil assembly having a guide along which the secondary coil assembly is moved into abutment of its core with a counterpart core of a primary coil assembly for ensuring proper mating between the paired cores to form a closed magnetic circuit.

In view of practical application in the future of battery-powered vehicles of various types from small vehicles, such as scooters and carts, to passenger cars and trucks of various sizes, it is desirable that each vehicle should be equipped with a battery whose output voltage suits the size or power requirement of that vehicle. To cope with the requirement of charging various batteries with the above charging apparatuses, it is necessary to change the induced secondary voltage to a desired level for each battery, which may be accomplished by changing the primary voltage to be applied across the winding in the primary battery charger. However, this method requires not only additional equipment for changing the primary voltage, but also troublesome operation of that equipment each time the type of battery to be charged is changed. Furthermore, power loss caused by the voltage changing cannot be overlooked.

SUMMARY OF THE INVENTION

Therefore, it is an object of the present invention to provide a method and a system that can make possible charging at least two kinds of propulsion batteries with different voltage ratings of electrically powered vehicles without using primary voltage changing equipment.

Another object of the invention is to provide a method and a system for charging at least two kinds of propulsion batteries with different voltage ratings simultaneously.

Still another object of the invention is provide a method and a system of charging propulsion batteries of electrically powered vehicles that can be put into practice by use of a simple apparatus.

The above objects of the invention can be accomplished by a method of charging a propulsion battery of an electrically powered vehicle, according to which a primary charger including a primary winding and connectable with a source of charging alternating current is provided at a battery charging station, and a plurality of secondary chargers each including a secondary winding having a selected number of turns and connected with a battery on each vehicle are provided. In charging any one of the batteries of the vehicle, the secondary winding associated with that battery is placed in an inductively coupled state with the primary winding so that a closed magnetic circuit is formed therebetween and, therefore, a secondary voltage is induced by electromagnetic induction across the secondary winding when a charging current is applied across the primary winding. The magnitude of the induced voltage is dependent on the turns ratio between the primary winding and the secondary winding. To be more specific, providing one secondary winding having a greater number of turns than another secondary winding, the voltage induced across the first secondary winding is higher than that to be induced across the second secondary winding. Thus, providing the winding of the secondary charger with an appropriate number of winding turns, its battery can be charged with the desired voltage without changing the primary voltage by using any additional equipment.

The system of battery charging according to the invention includes a primary charger having a primary winding connectable with a source of charging alternating current at a charging station and at least two secondary chargers each carried by a vehicle and including a secondary winding connected with a battery of the vehicle and having a number of turns different from that of at least one other of the secondary windings.

According to one preferred form of the system of the invention, the primary charger has a pair of separable cores one of which has a primary winding disposed therein, while the other of which has formed therein a winding receiving groove surrounding a pole piece. The secondary chargers include two secondary windings which have different numbers of winding turns and each of which is removably insertable in the reception groove about the pole piece of the primary charger. Therefore, when one of the secondary windings is set in the reception groove and a charging current is applied across the primary winding, a closed magnetic circuit is formed and a secondary voltage, the magnitude of which is dependent on the turns ratio between the primary and secondary windings, is induced by electromagnetic induction across the secondary winding. Thus, the desired voltage can be induced in the secondary winding depending on the turns ratio between the primary and secondary windings, which means that vehicles equipped with various propulsion batteries can receive battery recharging service from a common primary charging unit provided at a charging station without using any equipment for changing the primary voltage for each different battery. Accordingly, power loss due to the use of such additional equipment can be avoided and troublesome operation of the equipment is avoided.

The above and other objects, features and embodiments of the invention will become apparent from the following detailed description taken in conjunction with the accompanying drawings.

DETAILED DESCRIPTION OF THE EMBODIMENTS

First Embodiment

Figure 1:
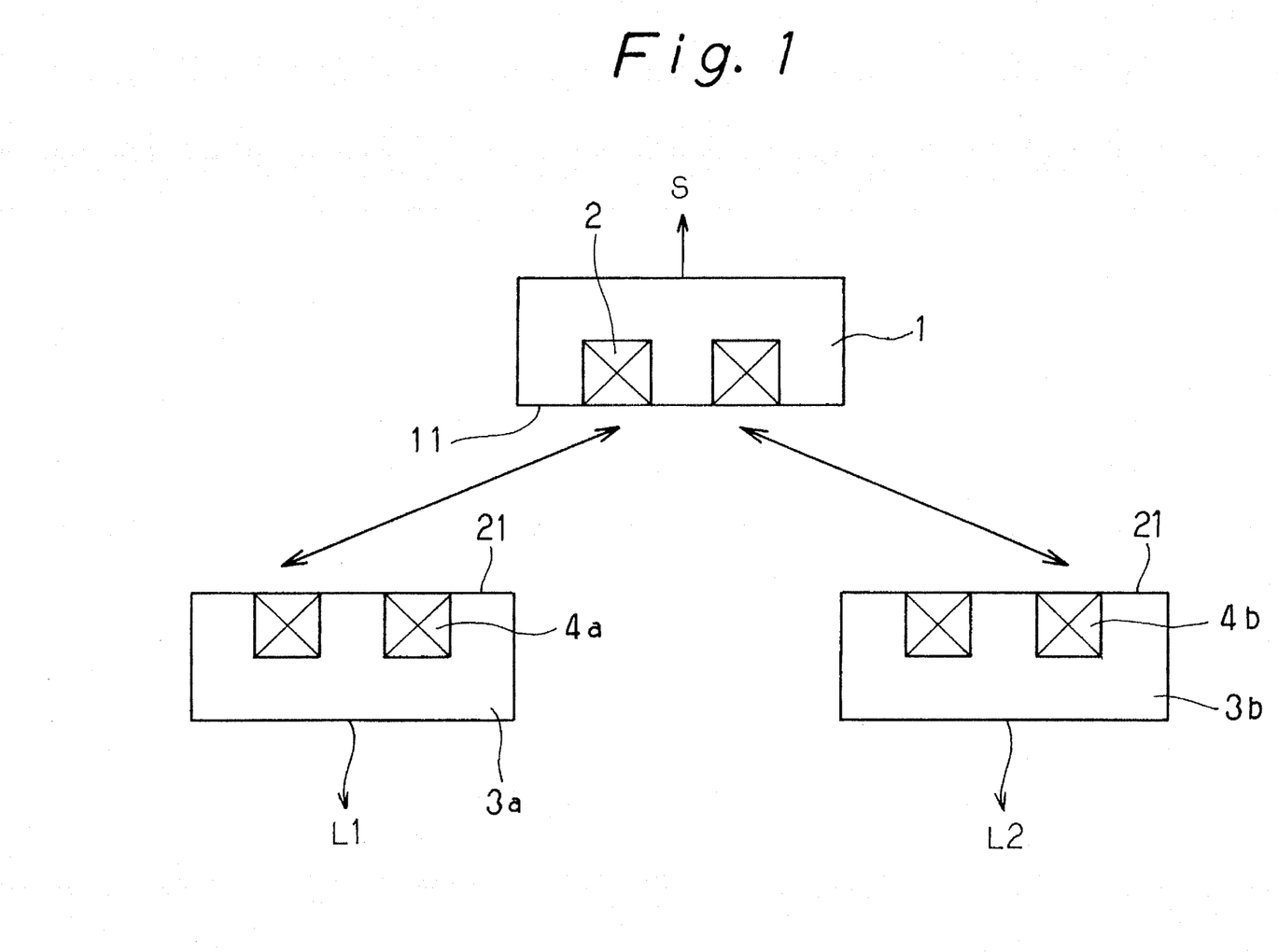
FIG. 1 is a block diagram illustrating a first embodiment of the battery charging system of the invention.

The following will describe the first embodiment of the battery charging method and system according to the present invention while having reference to FIG. 1.

Reference numeral 1 designates a magnetic core, for example, of an E-shape as seen in its cross section that has a central post projecting from the axial center of a disc-shaped core base and an annular skirt projecting from the rim of the base in the same direction, thus forming therebetween an annular groove in which a primary winding 2 is disposed. The core 1 has abutment surfaces 11 at the distal ends of the central post and the annular skirt. Thus, the core 1 and the winding 2 constitute a primary coil assembly. The primary winding 2 is electrically connected to a source of charging alternating current S (not shown) at a battery charging station. Reference symbols 3a, 3b denote independent first and second cores of the above E-shape having abutment surfaces 21 and annular grooves in which secondary winding 4a, 4b are fitted, respectively. Thus, the core 3a and the winding 4a form a first secondary coil assembly, and the core 3b and the winding 4b form a second secondary coil assembly. The secondary windings 4a and 4b have different numbers of winding turns, e.g. the former winding 4a having twice as many turns as the latter winding 4b. The first secondary coil assembly 3a, 4a is carried by a car (not shown) powered by, e.g., a 100-volt propulsion battery which is adapted to receive electrical power from the secondary winding 4a through a rectifier L1 (not shown) for changing an alternating current induced in the secondary winding 4a to a direct current. The second secondary coil assembly 3b, 4b is installed in a light vehicle, e.g. a motor-powered scooter (not shown) equipped with a 50-volt propulsion battery which is connected to the winding 4b through a rectifier L2 (not shown) for the same purpose as the first secondary coil assembly. The following will describe the operation of the above-described battery charging system.

When, for example, a car is parked at a battery charging station to recharge its 100-volt battery, the primary coil assembly 1, 2 of the charging station is mated with the first secondary coil assembly 3a, 4a of the car at their abutment surfaces 11, 21 to form a closed magnetic circuit. Then, the primary winding 2 and the secondary winding 4a are inductively coupled by a charging alternating current at any appropriate frequency in the primary winding to transfer the electrical power to the secondary winding 4a. The alternating current induced in the secondary winding 4a is converted by the rectifier L1 into a direct current, which is delivered to the battery. In charging the 50-volt battery of a scooter, the primary winding 2 and the secondary winding 4b are inductively coupled by the application of the same charging alternating current across the primary winding 2.

In so doing, the desired secondary voltage is induced for each vehicle in accordance with the turns ratio of the primary winding to the secondary winding that is then coupled thereto, without changing the primary voltage for each different battery. Therefore, additional equipment to change the primary voltage can be dispensed with and hence the operation associated therewith can be omitted and a possible power loss due to the primary voltage changing can be avoided. As understood readily by those skilled in the art, an additional number of secondary coil assemblies, such as 3a, 4a and 3b, 4b, but having windings with different numbers of turns, may be provided to cope with other different types of vehicles carrying propulsion batteries with different voltage ratings. It is to be noted that the magnetic core does not necessarily have to be of the E-shape as described in the above, but it may take other forms, as required, not only in the above-described first embodiment, but also in the other embodiments of the invention that will be described hereafter.

Second Embodiment

Figure 2:
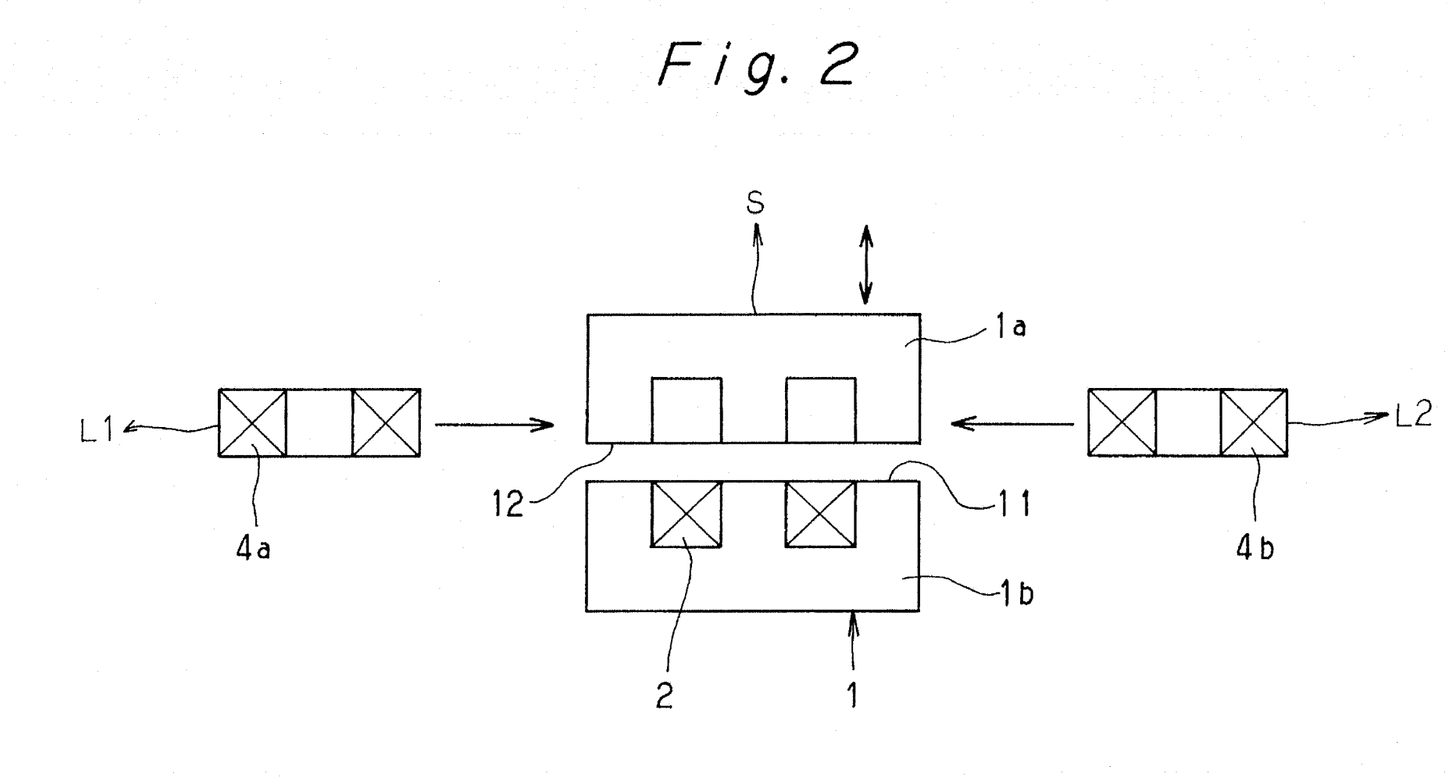
FIG. 2 is a block diagram illustrating a second embodiment of the battery charging system of the invention.

Referring to FIG. 2 showing the second embodiment of the invention, reference numeral 1 designates a pair of separable E-shaped magnetic cores including a movable core 1a having formed therein an annular groove for receiving therein a secondary winding and a stationary core 1b having a similar annular groove in which a primary winding 2 is disposed. The movable core 1a is adapted to be mated with its counterpart 1b at their abutment surfaces 12, 11. The paired cores 1 are provided at a battery charging station and the primary winding 2 is connected to a power supply S (not shown) to receive therefrom a charging alternating current. Reference symbols 4a, 4b represent first and second secondary windings, respectively, the first winding 4a being connected through a rectifier L1 (not shown) to a 100-volt propulsion battery carried by an electric car (not shown), while the second winding 4b being connected to a 50-volt battery of a motor-powered scooter (not shown) through a rectifier L2 (not shown). The first secondary winding 4a for the 100-volt battery has twice as many turns as the second secondary winding 4b for the 50-volt battery.

In operation, when a propulsion battery, e.g., of a motor-powered scooter is to be recharged, its secondary winding 4b is set in the annular groove in the core 1a. With the cores 1a, 1b closed, a charging alternating current is applied to the primary winding 2 to induce an alternating current at the desired voltage across the secondary winding 4b. To recharge the 100-volt battery of a car, on the other hand, its secondary winding 4a is placed in the groove of the core 1a and the primary and secondary windings are inductively coupled by application of the same source of power across the primary winding 2 as in charging the 50-volt battery. As in the first embodiment, secondary windings other than 4a, 4b with a different number of turns may be used for different types of vehicles.

Third Embodiment

Figure 3:
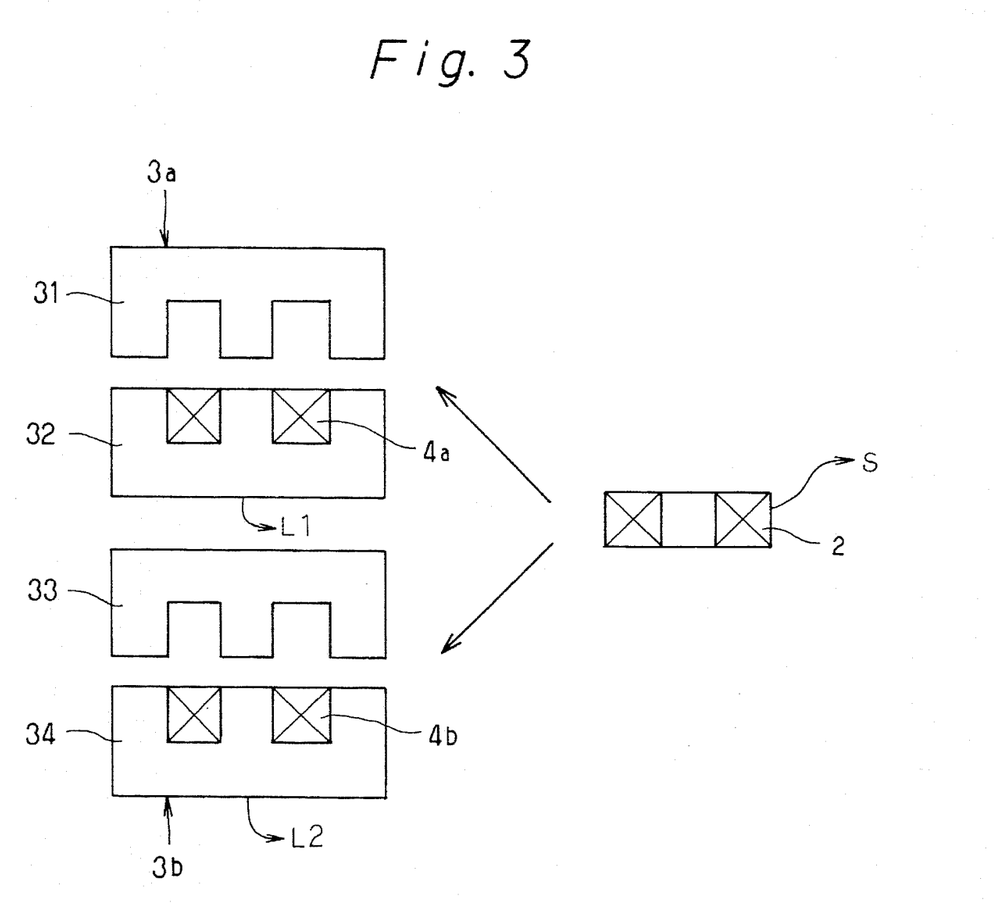
FIG. 3 is a block diagram illustrating a third embodiment of the battery charging system of the invention.

Referring to FIG. 3 showing the third embodiment of the invention, reference numeral 2 shows a primary winding which is provided at a battery charging station and connected to a source of power supply S (not shown). Reference symbols 3a, 3b depict two pairs of E-shaped magnetic cores each having an annular groove. Each pair includes a movable, or separable core 31, 33 and a stationary core 32, 34 having a secondary winding 4a, 4b disposed in the annular groove thereof. The first paired cores 3a are carried by an electric car (not shown) operated by a 100-volt battery connected to the secondary core 4a through a rectifier L1 (not shown), while the second paired cores 3b are mounted on an electrically powered scooter (not shown) equipped with a 50-volt battery adapted to receive electrical energy through a rectifier L2 (not shown). As in the first and second embodiments, the secondary winding 4a has twice as many turns as the secondary winding 4b.

In operation, when a scooter or a car is parked at a battery charging station to recharge its battery, the primary winding 2 is set in the annular groove of the appropriate separable core 31 or 33 and then the paired cores 31, 32 or 33, 34 are mated together to provide a closed magnetic circuit. With the cores thus closed, an alternating current with a specific frequency is applied to the primary winding 2 to produce the desired voltage across the secondary winding 4a or 4b. Other pairs of cores than 3a, 3b, having secondary windings with different numbers of turns may be prepared for different types of vehicles.

Fourth Embodiment

Figure 4:
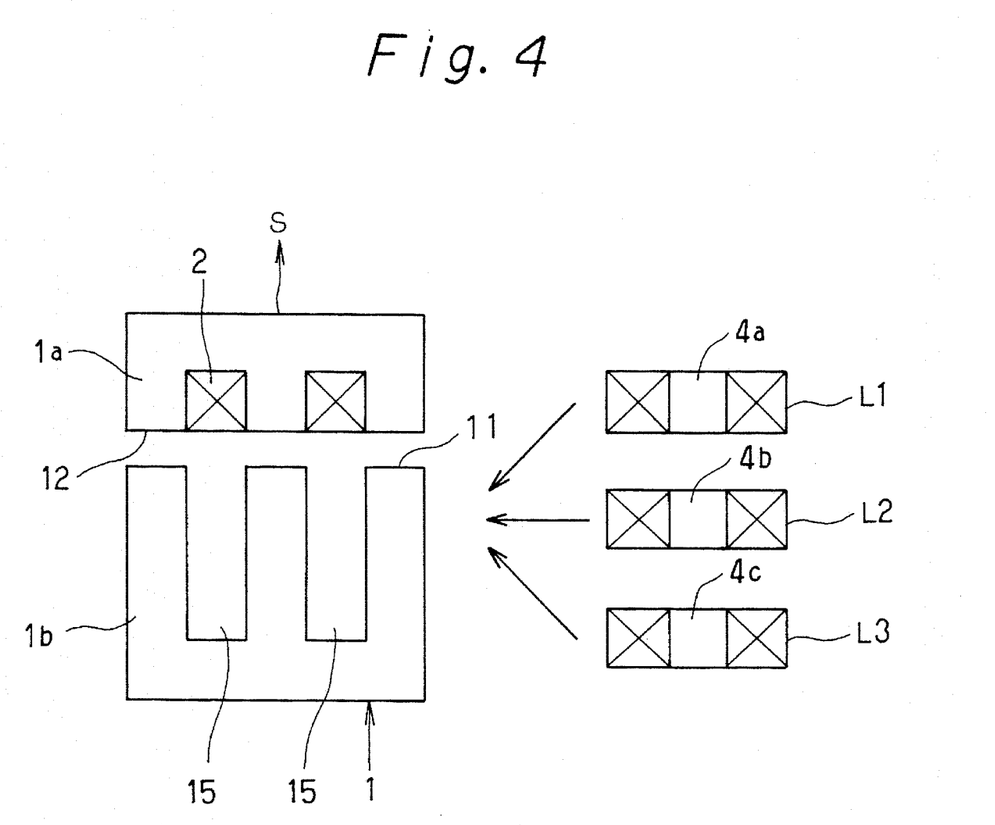
FIG. 4 is a block diagram of a fourth embodiment of the battery charging system of the invention, showing one manner of usage of the embodiment.

Referring to FIG. 4 showing the fourth embodiment of the invention, reference numeral 1 designates a pair of magnetic cores including a small core 1a formed with an annular groove in which a primary winding 2 is disposed and a large core 1b having formed therein a deep annular groove 15. The paired cores 1 are provided at a battery charging station and its primary winding 2 is connected to a source of charging alternating current S (not shown). Reference symbols 4a, 4b and 4c represent secondary windings having different numbers of winding turns from one another and connected through rectifiers L1, L2, L3 (not shown) to different batteries each carried by a different vehicle.

In operation, when two vehicles are parked at a battery charging station to recharge their batteries, the secondary windings, e.g. 4a and 4c, are set in the annular groove 15 of the core 1b. With the two cores 1a, 1b closed, an alternating current at a specific frequency is applied to the primary winding 2. In so doing, voltages at the desired values are induced in the respective secondary windings 4a, 4c and their batteries are recharged as required simultaneously.

Figure 5:
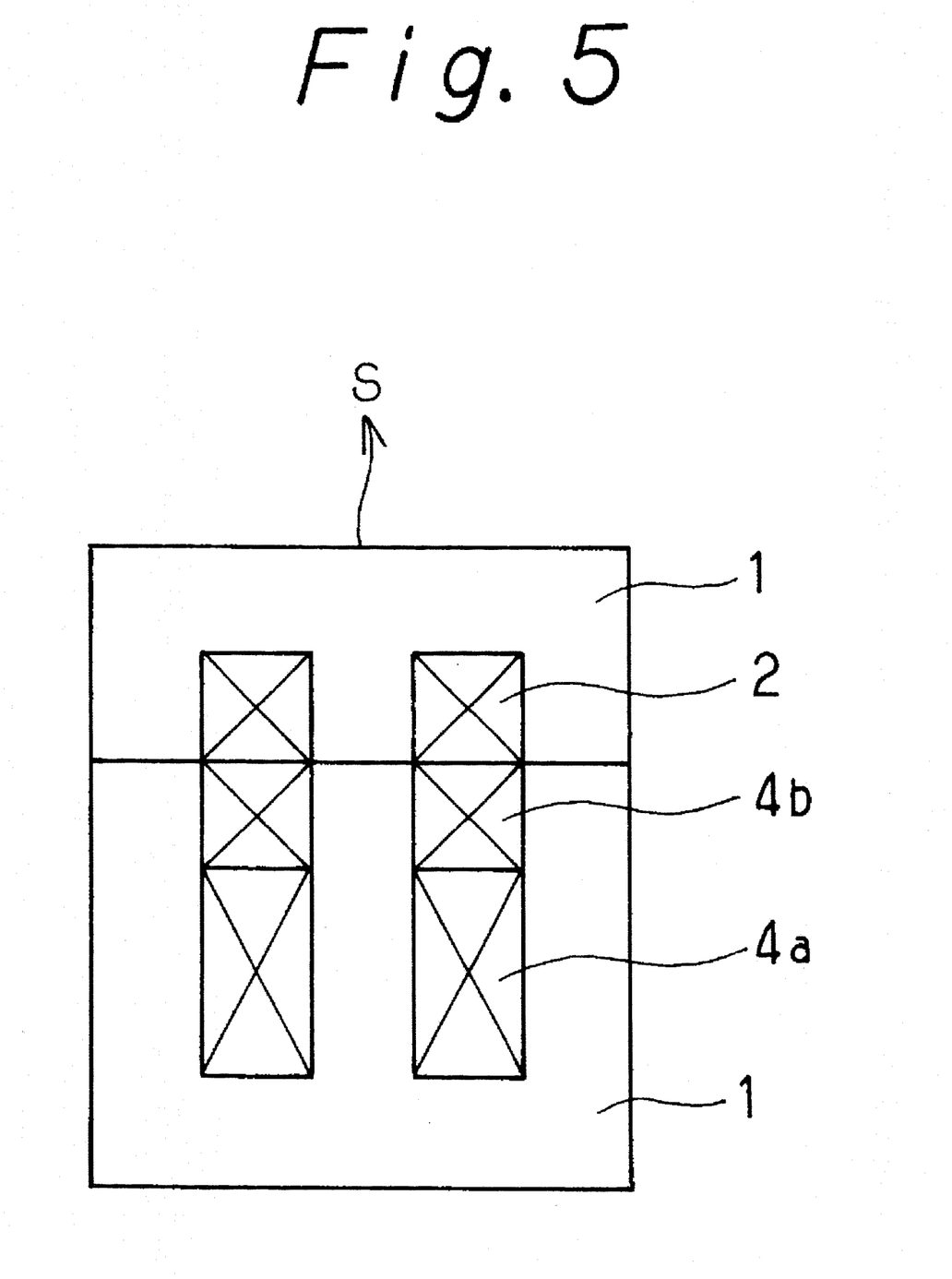
FIG. 5 is a block diagram of a fourth embodiment of the battery charging system, showing another manner of the usage of the embodiment.

As seen from FIG. 4, the secondary winding receiving groove 15 of the core 1b is formed with a size that can accommodate therein three secondary windings 4a, 4b, 4c at a time, so that three different batteries can be recharged simultaneously. As shown in FIG. 5, the primary coil assembly 1 may receive two windings 4a, 4b; one 4a having a greater number of coil winding turns and also larger in size for a heavier-duty vehicle than the other winding 4b for a smaller sized vehicle.

While the invention has been described with reference to the specific embodiments, it is to be understood that the present invention can be practiced in other changes and modifications without departing from the spirit or scope thereof.

What is claimed is:

1. A method of charging a plurality of different types of batteries of electrically powered vehicles, comprising:

providing a common primary winding having a fixed number of winding turns which is electrically connected with a source of charging current;

providing a plurality of secondary windings each of which is associated with a battery of a given type and carried by a vehicle with at least two of said secondary winding having different numbers of winding turns where the number of winding turns is related to the type battery with which the respective secondary winding is associated; and selecting at least one of said secondary windings for inductively coupling with said primary winding to form a closed magnetic circuit therebetween, whereby a secondary voltage, the magnitude of which is dependent on the turn ratio between said primary winding and said selected secondary winding, is induced electromagnetically across said selected secondary winding.

2. A system of charging a plurality of different types of batteries of electrically powered vehicles, comprising:

a primary charger including a common primary winding having a fixed number of winding turns constructed and arranged to be electrically connected with a source of charging current; and a plurality of secondary chargers each carried by a vehicle and having a respective secondary winding with a number of winding turns related to the type of an associated battery to be charged, said number of winding turns in at least two of said secondary windings being different from each other;

each of said secondary windings being constructed for selective coupling with said common primary winding to form a closed magnetic circuit therebetween, whereby when said primary winding is connected to said source of charging current a secondary voltage is induced electromagnetically across said coupled secondary winding, the magnitude of which secondary voltage is dependent on the turn ratio between said primary winding and said coupled secondary winding.

3. A system of charging a plurality of different types of batteries of electrically powered vehicles, comprising:

a primary charger including a common primary coil assembly having a primary core, and a primary winding having a fixed number of winding turns disposed on said primary core and constructed and arranged to be electrically connected with a source of charging current; and a plurality of secondary chargers each carried by a vehicle and having a respective secondary coil assembly having a respective secondary core and a secondary winding with a number of winding turns related to the of an associated battery to be charged and disposed on said core, said number of winding turns in at least two of said secondary windings being different from each other;

each of said secondary coil assemblies being constructed for selective coupling with said common primary coil assembly to form a closed magnetic circuit therebetween, whereby when said primary winding is connected to said source of charging current a secondary voltage is induced electromagnetically across said coupled secondary winding, the magnitude of which secondary voltage is dependent on the turn ratio between said primary winding and said coupled secondary winding.

4. A battery charging system according to claim 3, wherein each of said cores has an E-shape in the cross section thereof.

5. A system of charging a plurality of different types of batteries of electrically powered vehicles, comprising:

a charging assembly including a pair of separable primary and secondary cores, said primary core having disposed thereon a common primary winding constructed and arranged to be electrically connected with a source of charging current, and said secondary core having a pole piece for receiving a secondary winding thereabout; and a plurality of secondary chargers each carried by a vehicle and each having a respective secondary winding having a number of winding turns related to the type of an associated battery to be charged, said number of winding turns in at least two of said secondary windings being different from each other;

each of said secondary windings being removably disposable selectively about said pole piece of said secondary core to form a closed magnetic circuit with said primary winding when said primary winding is connected to said source of charging current, whereby a secondary voltage is induced electromagnetically across said secondary winding that is disposed about said pole piece, the magnitude of which secondary voltage is dependent on the turn ratio between said primary winding and said secondary winding that is disposed about said pole piece.

6. A battery charging system according to claim 5, wherein each of said cores has an E-shape in the cross section thereof.

7. A system of charging a plurality of different type of batteries of electrically powered vehicles, comprising:

a common primary winding having a fixed number of winding turns and constructed and arranged to be electrically connected with a source of charging current; and a plurality of charging assemblies each carried by a vehicle and each including a pair of separable primary and secondary cores, each of said primary cores having a pole piece for receiving said common primary winding thereabout, and each of said secondary cores having disposed thereon a respective secondary winding having a number of winding turns related to the type of an associated battery to be charged, said number of winding turns of at least one of said secondary windings being different from the number of winding turns of at least one other of said secondary windings;

said primary winding being removably insertable about said pole piece of each of said primary cores to form a closed magnetic circuit with the associated one of said secondary windings, whereby when said primary winding is connected to said source of charging current a secondary voltage is induced electromagnetically across said associated one of said secondary windings, the magnitude of which secondary voltage is dependent on the turn ratio between said primary winding and said associated one of said secondary windings.

8. A battery charging system according to claim 7, wherein each of said cores has an E-shape in the cross section thereof.

9. A system of charging a plurality of different types of batteries of electrically powered vehicles, comprising:

a pair of separable primary and secondary cores, said primary core having disposed thereon a common primary winding having a fixed number of winding turns and constructed and arranged to be electrically connected with a source of charging current, and said secondary core having a pole piece for receiving a secondary winding thereabout; and a plurality of charging assemblies each carried by a vehicle and each including a respective secondary winding having a number of winding turns related to the type of an associated battery to be charged, said number of winding turns in at least two of said secondary windings being different from each other;

said secondary core being constructed and arranged to removably receive about its pole piece at least one of said secondary windings to form a closed magnetic circuit between said common primary winding and said at least one secondary winding, whereby when said common primary winding is connected to said source of charging current a secondary voltage is induced electromagnetically across said at least one secondary winding, the magnitude of which secondary voltage is dependent on the turn ratio between said primary winding and said at least one secondary winding.

10. A battery charging system according to claim 9, wherein each of said cores has an E-shape in the cross section thereof.

* * * * *

UNITED STATES PATENT AND TRADEMARK OFFICE
CERTIFICATE OF CORRECTION

PATENT NO. : 5,539,296
DATED : July 23, 1996
INVENTOR(S) : M. Ito

It is certified that error appears in the above-indentified patent and that said Letters Patent is hereby corrected as shown below:

In the Abstract, line 11, "chargers" should read --charger--.

Column 4, line 1, "to" should read -- to 2 --.

Column 6, line 6, "winding" should read --windings--; line 8, after "type" insert --of--; line 50, after "the" insert --type--.

Column 7, line 31, "type" should read --types--.

Signed and Sealed this

Fourth Day of March, 1997

Attest:

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,539,296
DATED : July 23, 1996
INVENTOR(S) : Ito

It is certified that error appears in the above-indentified patent and that said Letters Patent is hereby corrected as shown below:

Column 1, line 19, "vehicles" should read --vehicle--;
line 22, "properly" should read --brought--.

Column 4, line 1, after "winding" insert --2--.

Signed and Sealed this

Seventeenth Day of June, 1997

Attest:

BRUCE LEHMAN

*Attesting Officer*   *Commissioner of Patents and Trademarks*